(12) United States Patent
Aho et al.

(10) Patent No.: US 8,646,960 B2
(45) Date of Patent: Feb. 11, 2014

(54) SCANNING BACKLIGHT WITH SLATLESS LIGHT GUIDE

(75) Inventors: Erik A. Aho, North Saint Paul, MN (US); John C. Schultz, Afton, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 444 days.

(21) Appl. No.: 12/849,531

(22) Filed: Aug. 3, 2010

(65) Prior Publication Data

US 2012/0033443 A1   Feb. 9, 2012

(51) Int. Cl.
*F21V 7/04* (2006.01)

(52) U.S. Cl.
USPC ............ 362/606; 362/610; 362/625; 362/628

(58) Field of Classification Search
USPC .......... 349/62, 64–67, 69; 362/606–610, 612, 362/613, 615, 616, 619–621, 623, 625, 626, 362/611
See application file for complete search history.

(56) References Cited

U.S. PATENT DOCUMENTS

| | | | |
|---|---|---|---|
| 4,789,921 A | 12/1988 | Aho | |
| 7,210,836 B2 | 5/2007 | Sasagawa et al. | |
| 7,528,893 B2 | 5/2009 | Schultz et al. | |
| 2005/0052750 A1 | 3/2005 | King et al. | |
| 2005/0141244 A1* | 6/2005 | Hamada et al. | 362/612 |
| 2006/0221611 A1 | 10/2006 | Noh et al. | |
| 2007/0047262 A1 | 3/2007 | Schardt et al. | |
| 2007/0058388 A1 | 3/2007 | Takatori et al. | |
| 2008/0084512 A1 | 4/2008 | Brott et al. | |
| 2008/0084518 A1* | 4/2008 | Brott et al. | 349/65 |
| 2008/0084519 A1 | 4/2008 | Brigham et al. | |
| 2008/0284801 A1* | 11/2008 | Brigham et al. | 345/690 |
| 2009/0268484 A1* | 10/2009 | Kim et al. | 362/608 |
| 2009/0316058 A1 | 12/2009 | Huizinga et al. | |
| 2009/0323372 A1* | 12/2009 | Kurihara et al. | 362/620 |
| 2011/0286236 A1* | 11/2011 | Kanade et al. | 362/606 |

FOREIGN PATENT DOCUMENTS

| | | |
|---|---|---|
| EP | 0762182 A1 | 3/1997 |
| JP | 09-147616 | 6/1997 |
| JP | 2001-266628 | 9/2001 |
| JP | 2004-207151 | 7/2004 |
| JP | 2004-227956 | 8/2004 |
| WO | WO 94/24589 | 10/1994 |
| WO | WO 2007/075549 | 7/2007 |
| WO | WO 2007/140076 | 12/2007 |
| WO | WO 2007/140092 | 12/2007 |
| WO | WO 2008/099581 | 8/2008 |
| WO | WO 2008/144650 | 11/2008 |

* cited by examiner

*Primary Examiner* — Nimeshkumar Patel
*Assistant Examiner* — Steven Horikoshi
(74) *Attorney, Agent, or Firm* — Lance L. Vietzke

(57) ABSTRACT

A backlight includes a light guide and a first and second light source adapted for independent operation and arranged to inject a first and second light beam, respectively, into the light guide through different portions of the light injection surface. Each light source includes a lamp and a concave reflector to partially collimate light from the lamp. One major surface of the light guide includes prismatic structures that are parallel to a first axis. Another major surface of the light guide includes lenticular structures that are parallel to each other but perpendicular to the prismatic structures. The lenticular structures limit spatial spreading for light that remains in the light guide. Each light source cooperates with the light guide to provide light that is substantially laterally confined to a transverse band of the light guide, even though the light guide contains no gaps that define slats to accomplish such confinement.

22 Claims, 7 Drawing Sheets

SCANNING BACKLIGHT WITH SLATLESS LIGHT GUIDE

FIELD OF THE INVENTION

This invention relates generally to backlit displays, with particular application to such displays that present distinct left- and right-eye images to allow for stereoscopic viewing, and backlights therefor. The invention also relates to associated articles, systems, and methods.

BACKGROUND

A stereoscopic display usually presents an observer with images with parallax from individual right and left eye viewpoints. There are several techniques of providing the two eyes of the observer with the parallax images to produce a stereoscopic viewing experience. In a first technique, the observer utilizes a pair of shutter or 3-dimensional ("3D") glasses which transmit or block light from the viewer's eyes in synchronization with alternating the left/right image display. In a second technique, right eye and left eye images are alternatively displayed and directed towards the respective eyes of the observer but without the use of 3D glasses. This second technique is referred to as autostereoscopic, and is advantageous for 3D viewing because there is no need for the observer to wear any type of specialized glasses. In some stereoscopic techniques, wavelength-selective glasses or polarized glasses must be worn by the viewer.

A liquid crystal display (LCD) is a sample-and-hold display device such that the image at any point or pixel of the display is stable until that pixel is updated at the next image refresh time, typically 1/60 of a second or faster. In such a sample and hold system, displaying different images, specifically displaying alternating left and right images for an autostereoscopic display, requires careful timing sequencing of the light sources so that, for example, the left eye image light source is not on during the display of data for the right eye and vice versa. Ensuring that the right and left light sources are on or off in synchronization with the image display is important to achieve a high quality autostereoscopic image.

Typically, when a liquid crystal display panel transitions from one image to the next, e.g., from a right eye image to a left eye image, different portions of the panel (i.e., different pixels of the panel) make the transition at slightly different times. For example, a top portion of the panel may make the transition first, followed by a middle or central portion of the panel, followed by a bottom portion of the panel. If the backlight is modulated between a left eye emitting beam and a right eye emitting beam uniformly over the entire output area of the backlight, crosstalk may occur over certain portions of the image. For example, a remnant of the left eye image may still be present on a portion of the display panel (e.g. on a bottom portion thereof) when the right eye beam of the backlight is turned on. Similarly, a portion of the right-eye image may appear on a portion of the display panel (e.g. on a top portion thereof) before the left eye beam of the backlight is turned off. This spatially-dependent time delay that characterizes the display panel's transition from one discrete image to the next gives rise to the desirability for a backlight whose output illumination can be controlled independently at different portions of its working area, so that the state of its output brightness (e.g. right eye beam on or off, and left eye beam on or off) can be synchronized with the state of the display panel both as a function of time and position on the working area of the display or backlight. Such a spatially addressable backlight, referred to as a scanning backlight, differs from conventional backlights in which all portions of the working area of the backlight are constrained to change from an "off" state to an "on" state, or vice verse, at the same time.

Scanning backlights for autostereoscopic displays are described in Patent Application Publication US 2008/0084512 (Brott et al.). Such backlights utilize a plurality of first light sources disposed on a first side of a light guide, and a plurality of second light sources disposed on an opposed second side of the light guide. In a non-scanning backlight, all of the first light sources would be illuminated (keeping the second light sources all "off") while displaying a right eye image in the display panel so that the entire active or working area of the backlight is illuminated with light that propagates in a first direction corresponding to the observer's right eye. Similarly, all of the second light sources would be illuminated (keeping the first light sources all "off") in a non-scanning backlight while displaying a left eye image so that the entire active or working area of the backlight is again illuminated, but with light that propagates in a second direction corresponding to the observer's left eye. In contrast to this, a scanning backlight may energize only one or some of the first light sources at a given time, and only one or some of the second light sources at a different time, so that only a limited portion (referred to as a segment) of the backlight, and thus only a limited portion of the display, emits right eye light or left eye light at any given moment. Selectively energizing different ones of the first light sources, and different ones of the second light sources, in a rapid sequence (in synchronization with the display) then allows all of the different segments of the backlight to be illuminated in a particular sequence or pattern to provide a scanning backlight.

The '512 Brott et al. publication describes achieving this type of scanning operation by use of a light guide construction that is "slatted", e.g. as depicted in FIGS. 1 and 2. Briefly, FIG. 1 shows a schematic front view of a scanning backlight 30 for displaying alternating right and left images. This backlight is formed by cutting or otherwise making gaps 37 in a monolithic light guide to define distinct segments or slats $30_1$, $30_2$, $30_3$, $30_4$, $30_5$, $30_6$, $30_7$, $30_8$. The gaps 37, which may be air gaps, also separate at least a portion of each segment or slat thickness from an adjacent segment or slat. Each slat includes a first side or light input surface 31 adjacent to a plurality of first light sources $32_1$, $32_2$, $32_3$, $32_4$, $32_5$, $32_6$, $32_7$, $32_8$ or right eye image solid state light source, and an opposing second side or light input surface 33 adjacent to a plurality of second light sources $34_1$, $34_2$, $34_3$, $34_4$, $34_5$, $34_6$, $34_7$, $34_8$ or left eye image solid state light source.

The schematic side view of FIG. 2 depicts only three segments or slats, but is otherwise generally consistent with the embodiment of FIG. 1. A first surface 36 (subdivided by gaps 37 into first surfaces $36_1$, $36_2$, $36_3$, and so forth) extends between the first side 31 and the second side 33, and a second surface 35 (subdivided by gaps 37 into second surfaces $35_1$, $35_2$, $35_3$, and so forth) opposite the first surface 36 also extends between the first side 31 and the second side 33. The first surface 36 substantially re-directs (e.g. reflects, extracts, and the like) light and the second surface 35 substantially transmits light to a double-sided prism film and an LCD panel (not shown).

The gaps 37 of the slatted construction provide lateral confinement of light in the different slats of the light guide. For example, light from first light source $32_1$ can propagate laterally within slat $30_1$ between first light input surface 31 and second light input surface 33, and can be emitted from the second surface $35_1$ of the slat $30_1$, toward the prismatic film and LCD panel, ultimately to the right eye of the observer. But the gaps 37 allow little or no light from this source $32_1$ to propagate laterally into any neighboring slats, such as slat $30_2$.

Thus, each slat or segment includes a first light source transmitting light into a segment first side, a second light source transmitting light into a segment second side, and a light transmission surface and an opposing light re-directing surface which each extend between the segment first side and the segment second side. The plurality of segments are arranged substantially in parallel and with the first surfaces transmitting light in substantially the same direction to provide backlighting for a stereoscopic 3D liquid crystal display. These segments are selectively lit from one side of each segment and illuminating each segment sequentially down the display. The video or data signals may drive the LCD panel in synchronization with the sequential lighting of the segments down the display.

BRIEF SUMMARY

We have developed a class of scanning backlights suitable for use in autostereoscopic displays, although they can also be used in other (non-autostereoscopic) displays, e.g., multiple viewer displays, and/or lighting applications. These backlights provide extended output surfaces that may substantially match the lateral dimensions of a display panel such as an LCD display panel so that all portions of the display panel, e.g. all of its pixels, can be backlit. Such a backlight may include a solid light guide having opposed first and second input edges, and a plurality of first light sources disposed along the first edge and a plurality of second light sources disposed along the second edge of the light guide. Light from the first light sources may be emitted from the backlight in a first angular distribution that preferentially corresponds to right eye viewing, e.g., it may be preferentially directed (with or without the assistance of one or more prismatic or other light management films) toward the right eye of the observer. Likewise, light from the second light sources may be emitted from the backlight in a different second angular distribution that preferentially corresponds to left eye viewing, e.g., it may be preferentially directed (with or without the assistance of the same one or more prismatic or other light management films) toward the left eye of the observer. The first light sources, as well as the second light sources, are adapted for independent operation so that, for example, at a given time only one of the first light sources may be energized, and at another time only a different one of the first light sources may be energized. The light sources and the light guide are designed so that only selected zones or bands of the output surface of the backlight can be made to emit light at any given time by energizing selected one(s) of the first light sources, or selected one(s) of the second light sources. Advantageously, substantial lateral confinement of the light emission from the output surface of the backlight can be achieved without the need for a slatted light guide, i.e., it can be achieved with a slatless light guide. Sequential control of the first light sources, for example, can then be used to sequentially illuminate different zones or bands of the backlight to provide the desired scanning functionality. This sequential control may alternate between the first and second light sources in synchrony with the display of right and left images by the display panel.

The present application therefore discloses, inter alia, a backlight suitable for use in an autostereoscopic display, or in a multiple viewer display. The backlight includes a light guide, and a first and second light source. The light guide has opposed first and second major surfaces, and at least a first light injection surface. The first light injection surface may be or comprise, for example, one of two opposed side surfaces of the light guide. The first and second light sources, which are adapted for independent operation, may be arranged along the first light injection surface to inject a first and second light beam, respectively, into the light guide through different portions of the first light injection surface. Preferably, the first and second light beams are partially collimated.

The first major surface of the light guide may comprise a plurality of first structures that are parallel to each other and to a first axis. For example, the plurality of first structures may comprise an array of prisms, each prism having an include angle (full dihedral angle between facets of a given prism) of at least 160, or 165, or 170, or 175 degrees.

The second major surface of the light guide may comprise a plurality of second structures that are also parallel to each other but also to a second axis different from the first axis. The second axis may, for example, be substantially perpendicular to the first axis. The second structures may be adapted to enhance angular spreading along the first axis for light that passes out of the light guide through the second major surface, and also to limit spatial spreading along the first axis for light that remains in the light guide by reflection from the second major surface. Exemplary second structures are arranged in a regular array, and/or exhibit a structure-to-structure spacing that is smaller than a transverse band associated with the first light source. The second structures may have a curved shape, or other non-flat shape, in cross-section, and the non-flat shape may be or comprise a circular arc characterized by an angle in a range from 45 to 180 degrees, or 90 to 180 degrees, for example.

The first light source may cooperate with the light guide such that light from the first light source is substantially laterally confined to a first transverse band of the light guide, even though the light guide contains no gaps that define slats to accomplish such confinement. Similarly, the second light source may cooperate with the light guide such that light from the second light source is substantially laterally confined to a second transverse band of the light guide different from the first transverse band. The transverse bands may each extend along the second axis, and may be shifted relative to each other along the first axis. Although light is laterally confined in the transverse bands, light in these bands is relatively free to escape from at least one of the major surfaces (referred to above as the second major surface) in order to illuminate a display panel or other object or area of interest.

The first and second light sources may be members of a first plurality of light sources arranged along the first light injection surface, each such light source comprising at least one lamp and a concave reflector disposed to partially collimate light from the lamp in a plane of the light guide. For each light source of the first plurality of light sources, the concave reflector may be substantially parabolic, and the at least one lamp may be disposed proximate a focus of the parabolic reflector. The backlight may also include a second plurality of light sources arranged along a second light injection surface of the light guide opposite the first light injection surface. Here again, each light source of the second plurality of light sources may comprise at least one lamp and a concave reflector to partially collimate light from the lamp in a plane of the light guide. Each light source, whether of the first plurality of light sources and/or the second plurality of light sources, may include at least one lamp and a concave reflector to partially collimate light from the lamp in a plane of the light guide. The concave reflector may, for example, be substantially parabolic, and the at least one lamp may be disposed proximate a focus of the parabolic reflector. For each light source, the concave reflector may define a vertex and an output aperture. In one orientation, the at least one lamp has an emitting surface oriented to face the output aperture. In another orientation, the at least one lamp has an emitting surface oriented to face the vertex of the concave reflector.

The application also discloses backlights that include a light guide and a first and second light source. The light guide may have opposed first and second major surfaces, and at least a first light injection surface. The first and second light sources, which are adapted for independent operation, may be arranged along the first light injection surface to inject a first and second light beam, respectively, into the light guide through different portions of the first light injection surface. The first and second light beams may be partially collimated. The first major surface of the light guide may comprise a plurality of first structures that are parallel to each other and to a first axis. For example, the plurality of first structures may comprise an array of prisms, each prism having an include angle of at least 160, or 165, or 170, or 175 degrees. The second major surface of the light guide may comprise a plurality of second structures that are also parallel to each other but also to a second axis different from the first axis. The second axis may, for example, be substantially perpendicular to the first axis. The first and second light sources, and the first and second structures, may be adapted so that light from the first light source is substantially laterally confined to a first transverse band of the light guide, and light from the second light source is substantially laterally confined to a second transverse band of the light guide different from the first transverse band.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

In the figures, like reference numerals designate like elements.

DETAILED DESCRIPTION OF ILLUSTRATIVE EMBODIMENTS

As outlined above, we describe herein, among other things, backlight designs in which portions (e.g. transverse bands) of the output surface of the backlight can be selectively lit-up or illuminated by energizing selected one(s) of a plurality of partially collimated light sources disposed along a light injection surface of a slatless light guide. Selectively energizing the light sources in a timed sequence results in a timed sequence of different distinct portions or bands of the output surface of the backlight emitting light, thus providing a scanning backlight. We use the term "backlight" in this application to refer to an extended source that is intended or adapted to illuminate a partially transparent object such as a display panel, graphic film, sign, or the like from behind such object, but unless otherwise indicated to the contrary we also intend "backlight" to encompass other types of lighting devices that may not illuminate another object from behind, e.g., luminaires and channel lettering.

Preferably, the backlight is adapted for use in autostereoscopic displays, in which case one group of light sources, disposed along a first light injection surface of the light guide, produces light that is emitted from the backlight in a first angular distribution corresponding to observation by a first eye of an observer. Such a backlight also includes a second group of light sources, disposed along a second light injection surface of the light guide, to produce light emitted from the backlight in a second angular distribution corresponding to observation by a second eye of an observer. Judicious activation of one or more light sources in the first and second group of light sources allows control of which portion(s) (e.g. transverse band(s)) of the output area of the backlight emit light at a given time, and whether that emitted light is directed to a right eye or a left eye of the observer.

Figure 1:
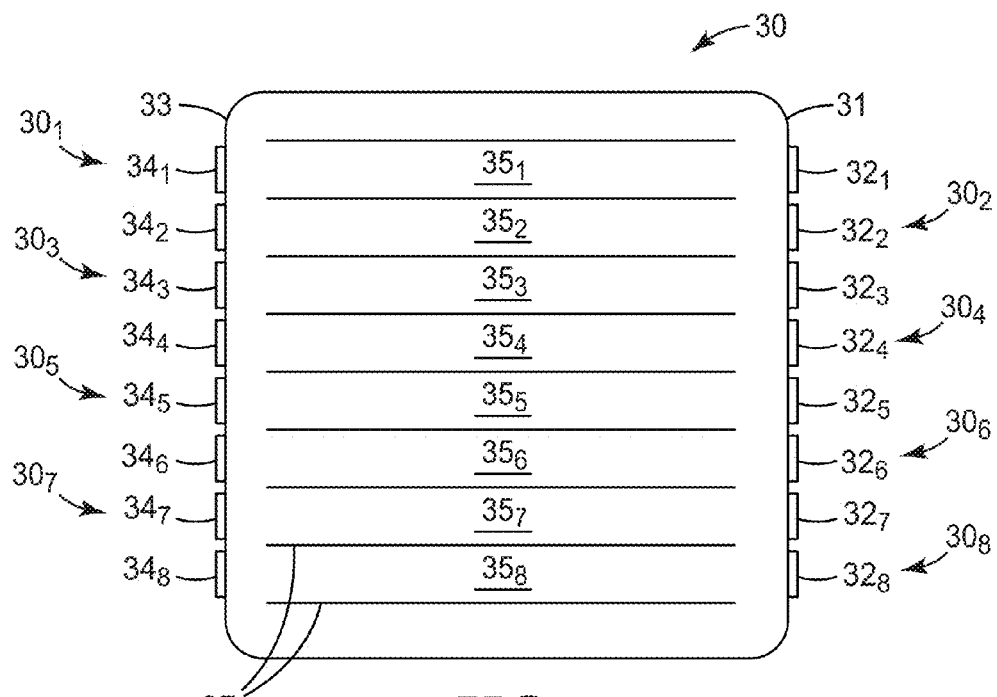
FIG. 1 is a schematic diagram front view of a PRIOR ART scanning backlight for displaying alternating right and left images.
Figure 2:
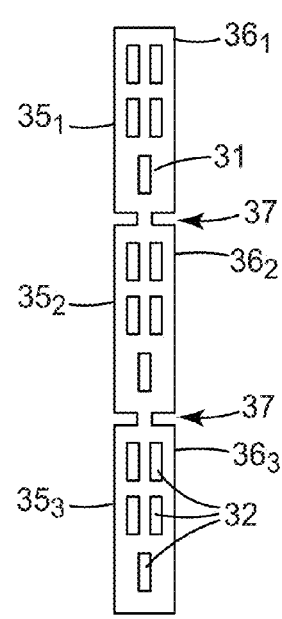
FIG. 2 is a schematic side view of a PRIOR ART scanning backlight for displaying alternating right and left images.
Figure 3A:
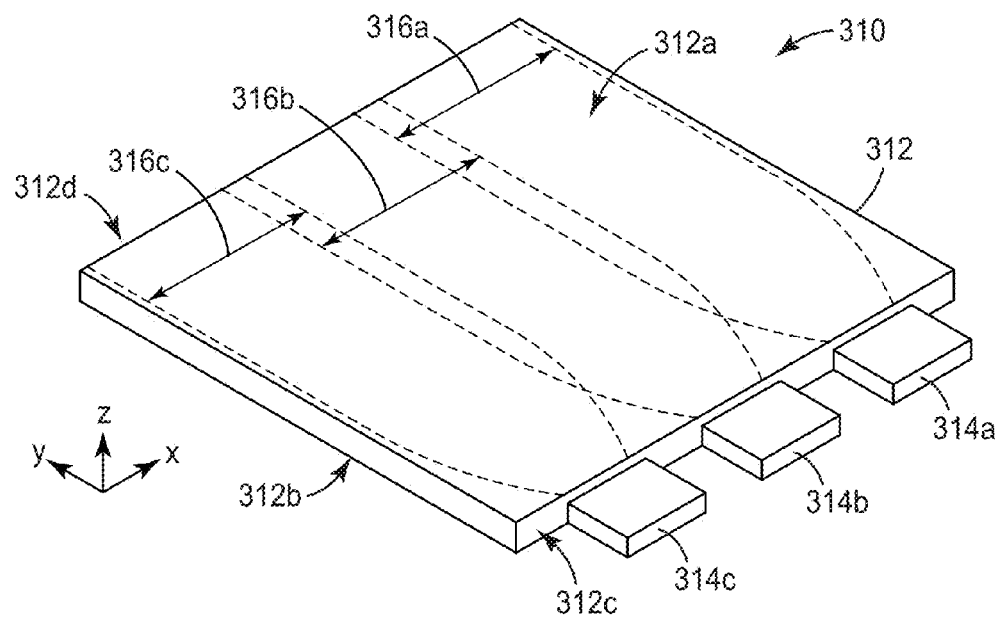
FIG. 3*a* is a schematic perspective view of a scanning backlight utilizing a slatless light guide with a group of light sources disposed along one light injection surface thereof.

An exemplary scanning backlight 310 that utilizes a slatless light guide is shown in schematic perspective view in FIG. 3*a*. The backlight includes a solid light guide 312 and a group of partially collimated light sources 314*a*, 314*b*, 314*c*, which may be referred to generically as light sources 314. The light guide 312 has a first major surface 312*a* and an opposed second major surface 312*b*, and a first side surface 312*c* and an opposed second side surface. The first major surface 312*a* is an output surface of the light guide and may also substantially function as an output surface or working surface of the backlight. The side surface 312*c* is adapted to function as a light injection surface, e.g., it may be flat and/or smooth with little or no scattering of light, and it may include an antireflective coating or other antireflective features to facilitate light injection into the light guide 312. The light sources 314 are disposed along the side surface or light injection surface 312*c* so as to inject partially collimated light beams into the light guide 312 through different portions of the surface 312*c*. Light from any of these light sources may expand somewhat in width as it propagates through the light guide, but, due to the partial collimation of the light source itself as well as to structured surface features provided on the major surfaces of the light guide (discussed further below), the expansion can be made to be relatively gradual so that the light remains fairly confined to an elongated band-like area of an output surface, as shown with the dashed lines representing the borders or edges of the propagating light from the respective sources. If desired, one may characterize the lateral widths of the illuminated bands produced by the individual light sources 314a, 314b, 314c as widths 316a, 316b, 316c, respectively, as shown.

A Cartesian x-y-z coordinate system is provided in the figure for reference purposes. Exemplary light guides are composed of a suitable light-transmissive material such as a polymer or glass. The light guide may be relatively rigid or flexible, and it may be relatively thin (e.g. in the form of a film) or thick. The light guide may have a substantially rectangular shape in plan view as shown in the drawings, but non-rectangular shapes may also be used. A back or rear major surface (see surface 312b in FIGS. 3a and 3b) of the light guide may be shaped to include a plurality of extraction elements; features such as linear lenticular features, or linear prism features are useful. Each of the linear prisms may extend in a direction parallel to the side surfaces 312c, 312d, i.e., parallel to the x-axis shown in the figure. The linear prism features cause the back major surface (see surface 312b) to substantially redirect (e.g., reflect, extract, and the like) light, while the front major surface (see surface 312a) substantially transmits light. In some cases, a highly reflective surface on or adjacent the back major surface helps to redirect light out of the backlight through the front major surface. The front major surface may be substantially flat, but is preferably structured with light spreading elements such as lenticular, prismatic, or similar features that spread the light exiting the front surface of the light guide in the vertical direction, i.e., in the x-z plane of FIG. 3a. Further design details regarding light guides suitable for use in autostereoscopic backlights can be found in U.S. Pat. No. 7,210,836 (Sasagawa et al.), and U.S. Patent Application Publication US 2009/0316058 (Huizinga et al.). Reference is also made to U.S. Patent Application Publication US 2008/0084519 (Brigham et al.).

The light guide 312, as well as the backlight 310 generally, extends along two orthogonal directions (x,y) to define a plane of the light guide or backlight, and a normal or perpendicular direction (z) which typically (but not necessarily) corresponds to an optical axis or viewing axis of the light guide and backlight. As light from a given light source 314 propagates through the light guide 312 generally along the y-axis, a limited amount of expansion occurs along the x-axis as discussed above. While this is happening, much of the light is reflected (e.g. totally internally reflected (TIR)) by the rear major surface 312b upwards towards the front major surface 312a, and refracted out of that surface into the air, ultimately reaching an observer or viewer, for example. A balanced amount of such reflection and refraction helps to ensure that the illuminated band has an acceptable degree of uniformity along its length, i.e., along the y-axis.

The light sources are preferably adapted for independent operation. For example, the light sources may be separately electrically connected to different driver circuits controlled by a suitable control circuit, such that any light source can be turned on or off independently of any other light source. In some cases, the control circuit may operate the driver circuits to energize the light sources individually in an ordered sequence, e.g., in a cyclic fashion. For example, the controller may energize source 314a by itself, followed by source 314b by itself, followed by source 314c by itself, then cycling back again to source 314a by itself, and so forth. Such cyclic control of the light sources may be synchronized with the transition of corresponding zones or bands of a display panel from one image to another image. Of course, although the figure shows only three partially collimated light sources 314, any number of light sources greater than one may be used.

The backlight 310, and other backlights discussed herein, may include other components besides those shown in the figures. For example, the rear major surface 312b of light guide 312 may be partially transmissive, and a high reflectivity back reflector, such as a plate or film of aluminum or other reflective metal, a multilayer reflective film such as Vikuiti™ Enhanced Specular Reflector Film (ESR) available from 3M Company, or the like, may be placed behind the surface 312b so as to reflect light back towards the light guide and, ultimately, to the display panel and/or observer. One or more prismatic light redirecting films may be placed in front of the front major surface 312a, particularly if the light guide 312 is designed so that light extracted from the surface 312a is emitted into air at highly oblique angles, e.g., peaking in luminance at about 70 degrees from the normal direction, or having a peak luminance in a typical range from 50 to greater than 80 degrees, or from 60 to greater than 80 degrees. This highly oblique light may be intercepted by the redirecting film, which is microstructured in such a way as to redirect the highly oblique light exiting the light guide 312 so that it is directed closer to the optical axis of the system, e.g., closer to the z-axis. Other light management films, such as one or more polarizers (whether absorptive polarizers and/or reflective polarizers, and whether linear and/or circular polarizers), diffusers, brightness enhancement films, window films or plates, or the like may also be used.

Figure 3B:
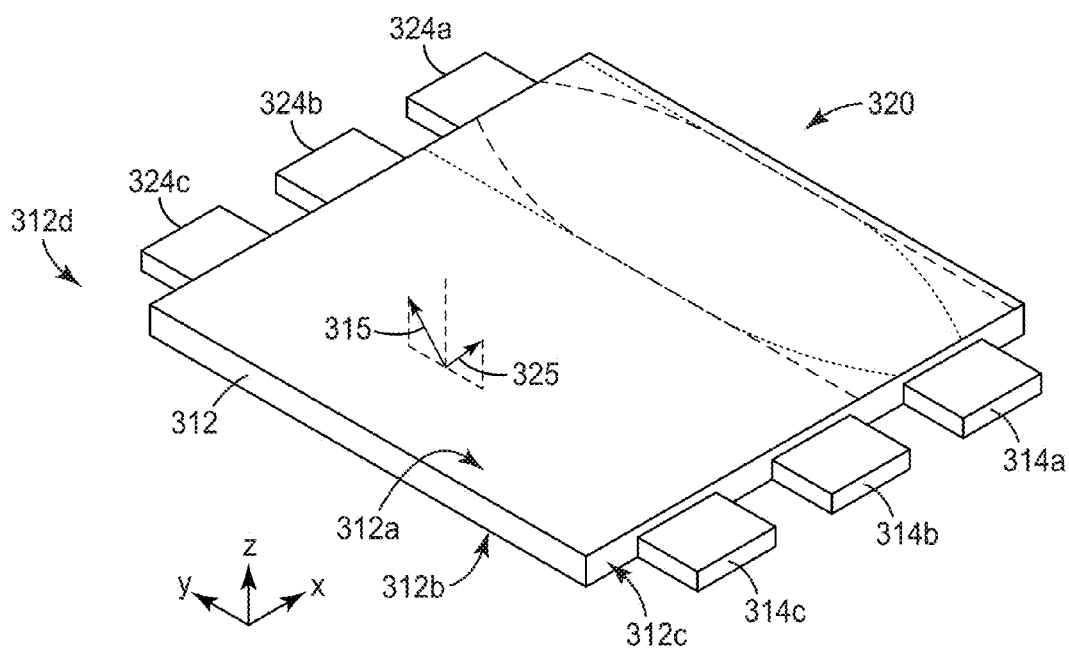
FIG. 3*b* is a schematic perspective view of the backlight of FIG. 3*a*, wherein a second group of light sources has been added along an opposite light injection surface.

A second group of partially collimated light sources, oppositely disposed relative to sources 314, may also be included, and the resulting backlight 320 is shown in FIG. 3b. Backlight 320 may be substantially identical to backlight 310 of FIG. 3a, except for the addition of the partially collimated light sources 324a, 324b, 324c, which may be referred to generically as light sources 324. Similar to side surface 312c, the side surface 312d of the light guide 312 may also be adapted to function as a light injection surface, e.g., it may be flat and/or smooth with little or no scattering of light, and it may include an antireflective coating or other antireflective features to facilitate light injection into the light guide 312. The light sources 324 are disposed along the side surface or light injection surface 312d so as to inject partially collimated light beams into the light guide 312 through different portions of the surface 312d. Light from any of these light sources may expand somewhat in width as it propagates through the light guide, but, due to the partial collimation of the light source itself as well as to structured surface features provided on the major surfaces of the light guide (discussed further below), the expansion can be made to be relatively gradual so that the light remains fairly confined to an elongated band-like area of an output surface, as shown with the representative pair of dashed lines originating from source 324a representing the borders or edges of the light propagating from light source 324a (a counterpart pair of dashed lines are also shown originating from source 314a). If desired, one may characterize the lateral widths of the illuminated bands produced by the individual light sources 314a, 314b, 314c as widths 316a, 316b, 316c, respectively, as shown.

Due to the design of the light guide 312, light originating from the light sources 314 may exit the surface 312a of the light guide at a highly oblique angle in a leftward-direction (closer to the +y direction) from the perspective of FIGS. 3a and 3b, see e.g. representative light ray 315, while light originating from the light sources 324 may exit the surface 312a at a highly oblique angle in a rightward-direction (closer to the −y direction) from the same perspective, see e.g. representative light ray 325. If a redirecting film is placed atop the light guide, or otherwise disposed in front of the surface 312a, it is preferably designed to redirect the oblique light 315 originating from the light sources 314 in directions that are less oblique, i.e., closer to the optical axis or z-axis, so that it is directed towards one eye (e.g. a right eye) of an observer. The redirecting film may likewise redirect the oblique light 325 originating from the light sources 324 in directions that are less oblique so that it is directed towards the other eye (e.g. a left eye) of the observer. Thus, the light sources 314 may generate right eye beams along selected zones or bands of the light guide and backlight, and light sources may generate left eye beams along selected zones or bands of the light guide and backlight.

Exemplary redirecting films have structured or faceted features on both major surfaces of the film. The front major surface, which faces the observer, may comprise linear lenticular features. The back major surface, which faces the light guide, may comprise linear prismatic features. The linear prismatic features are preferably parallel to each other, and parallel to the linear lenticular features on the front surface of the film. Moreover, the redirecting film is preferably oriented such that the linear lenticular and prismatic features of the redirecting film are parallel to prismatic features on the back major surface of the light guide, discussed further below. The lenticular and prismatic features of the redirecting film are designed such that highly oblique light emitted by the front major surface of the light guide is converted to more axially-directed light emitted at the proper angles such that an observer can perceive depth in the displayed image. Further design details of exemplary redirecting films can be found in one or more of the following documents: U.S. Pat. No. 7,210,836 (Sasagawa et al.); and U.S. Patent Application Publications US 2005/0052750 (King et al.), US 2008/0084519 (Brigham et al.), and US 2009/0316058 (Huizinga et al.).

Figure 4A:
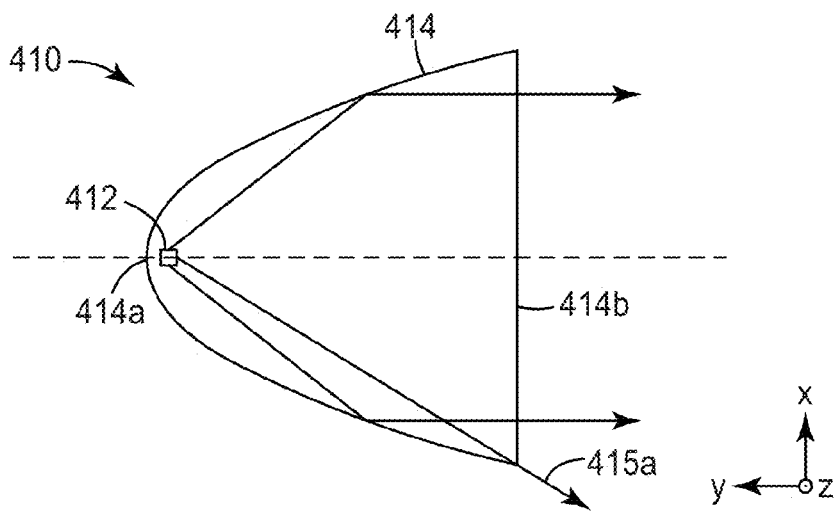
FIGS. 4*a* and 4*b* are top and side schematic views, respectively, of an exemplary partially collimated light source.
Figure 4B:
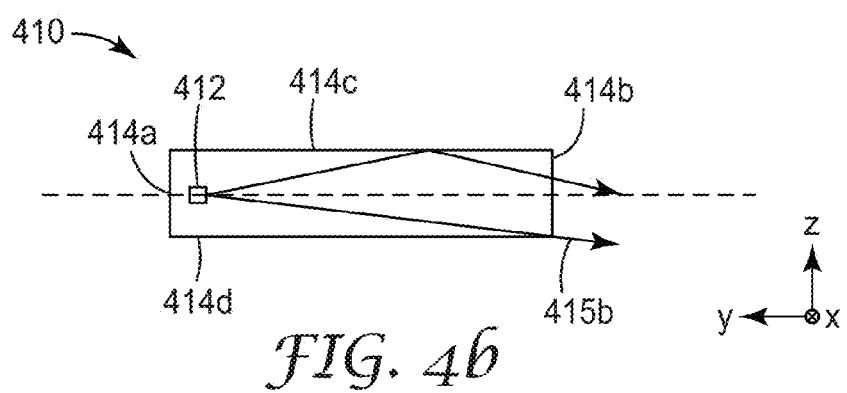

FIGS. 4a and 4b are top and side schematic views, respectively, of an exemplary partially collimated light source 410 suitable for use in the disclosed backlights. The light source 410 preferably comprises at least one lamp 412, which converts electrical energy e.g. in the form of a current or voltage, into visible light. To provide at least some degree of collimation, the light source also preferably comprises a concave reflector 414 which is shaped and disposed to partially collimate light from the lamp in the plane of the light guide, i.e., in the x-y plane. For example, the reflector 414 may be parabolic or substantially parabolic (e.g. deviating from a perfect parabola by manufacturing tolerances, or by amounts that are less then the deviation of a best-fit circle to the perfect parabola), and the light source may be placed at or near the focus of the parabola. Alternatively, the concave reflector may have another shape that can at least partially collimate light from the lamp, e.g., circular or spherical, hyperbolic, and v-shaped or cone-shaped, for example, and the shape may be smooth with a continuously varying surface tangent, or may be segmented (e.g. made up of individual flat facets) with a discontinuous surface tangent. A parabolic reflector may have a surface defined by the equation $y=a*x^2$. The reflector 414 may have a vertex 414a and an output aperture 414b. The vertex may be a point, e.g. in the case of a parabola of revolution, or it may be a line segment as shown in the side view of FIG. 4b. The space taken up by the reflector 414 may be hollow or solid, e.g., composed of a light-transmissive material such as glass or plastic. The reflector 414 preferably has a high reflectivity of light, e.g. at least 70%, 80%, or 90%, substantially over the entire visible spectrum, e.g. from about 400-700 nm, or for the photopic response curve of the human eye. This reflectivity may be provided by a reflective metal surface, e.g. a thin film or a surface of aluminum or other suitable metal, or by a multilayer optical film, including inorganic multilayer optical films and organic (e.g. polymer) multilayer optical films. If the space taken up by the reflector is solid, the reflectivity may also be provided by total internal reflection, and/or partial reflection, at the solid/air interface.

In the embodiment of FIGS. 4a-4b, partial collimation is provided in the plane of the light guide (the x-y plane) by the concave shape of the reflector 414 in that plane. Collimation is typically partial rather than complete as a result of various factors including unintentional deviations of the reflective surface from an ideal shape, the finite extent of the lamp (such that portions of the lamp are substantially displaced from the focus of the reflector), and geometrical considerations (for example, light rays emitted by the lamp over a range of angles may propagate directly through the output aperture 414b with no reflection, see e.g. ray 415a in FIG. 4a). In the depicted embodiment, the reflector 414 includes substantially planar top and bottom reflectors 414c, 414d, respectively, which are shown as being substantially parallel to each other such that they provide substantially no collimation in the y-z plane, i.e., in the plane perpendicular to the light guide. In alternative embodiments, the top and bottom reflectors may be arranged to be converging, so as to decollimate or widen the solid angle of emitted light in the y-z plane, or they may be arranged to be diverging, so as to at least partially collimate or narrow the solid angle of emitted light in the y-z plane. Note that the top and bottom reflectors need not be flat, and as mentioned above in the case of a parabola of revolution, may form a continuous smooth surface with the other surfaces or portions of the reflector. In other cases, a top and/or bottom reflector may be omitted if desired. Ray 415b in FIG. 4b represents a ray of light emitted by the lamp that propagates directly through the output aperture 414b with no reflection from the top or bottom reflectors.

The use of converging top and bottom reflectors can reduce the area of the output aperture of the light source, which in turn can help to reduce left beam/right beam crosstalk when separate left- and right-beam light sources are used. Left beam/right beam crosstalk occurs when light from one light source (e.g. a light source that emits a right eye beam from the backlight) traverses the entire length of the light guide and then reflects off of light sources or other components at the far end of the light guide. The reflected light traverses the light guide in the opposite direction of the original beam, and may have the same effect as light emitted from a light source on the far side of the light guide (e.g. a light source that emits a left eye beam from the backlight). The presence of the reflected beam can produce crosstalk by enabling one eye (e.g. the left eye of the observer) to perceive an image that is intended only for the other eye (e.g. the right eye of the observer), thus detracting from the 3D experience of the display. Commonly assigned U.S. Publication No. 2011/0285927, incorporated herein by reference, discusses this crosstalk phenomenon in more detail and teaches a variety of techniques for minimizing such crosstalk, any of which can be put to use in the present application. For purposes of the present discussion, we point out simply that reducing the size or area of the output apertures of the light sources can be beneficial in reducing left/right beam crosstalk.

In some cases it is advantageous to deliberately position the lamp at a place different from the focal point of the reflector, to provide better overall collimation when factoring in "worst case light", i.e., light that propagates from the lamp to the output aperture of the light source without reflecting from the concave reflector (see ray 415a in FIG. 4a). For example, in reference to FIG. 4a, if light source 412 is positioned closer to the vertex 414a, light rays that reflect from the reflector 414 will be somewhat less collimated as they exit the output aperture 414b, but the maximum angle of rays such as ray 415a is reduced, i.e., the worst case light will be somewhat more collimated.

In the orientation of FIGS. 4a-b, the lamp 412 has an emitting surface oriented to face the output aperture 414b of the reflector. In an alternative embodiment, the lamp may have an emitting surface oriented to face the vertex of the concave reflector. Such an embodiment is shown in the top schematic view of FIG. 5. In this figure, a partially collimated light source 510 includes a lamp 512 and concave reflector 514. The lamp 512 may be the same as or similar to lamp 412 of FIGS. 4a-b, but is oriented to emit light generally in the +y direction rather than the −y direction, i.e., towards a focus 514a of the reflector 514 rather than towards an output aperture 514b. This backward-looking arrangement advantageously allows for reflectors that are smaller in dimension along the y-axis, compared to forward-looking designs such as that shown in FIGS. 4a-b, thus allowing for backlight designs with a narrower bezel around the edge of the backlight in which the light sources are disposed. The discussion of design details provided above in connection with reflector 414, e.g., aspects of the space of the reflector, various reflective mechanisms, potential top and bottom reflectors, and so forth is equally applicable to the reflector of FIG. 5.

The light sources for the disclosed backlights and displays may comprise any suitable light source or lamp now known, or developed or introduced after the filing date of the present application. Preferably, the light source is capable of modulation at a rate of, for example, at least 60 Hz. In most applications, it is desirable for the backlight to emit white light. ("White light" in this regard refers simply to light that is perceived by the observer as nominally white, even though the light may have a discontinuous or spiked power spectrum over the visible wavelength range. White light may also be perceived by rapid modulation of distinct colors that individually are not white.) In those cases, the individual light sources or lamps used in the light source assemblies may each emit white light, and/or, clusters or groups of colored light sources may be used, e.g., one or more clusters of a red-emitting source, a green-emitting source, and a blue-emitting source. In some applications, however, it may be desirable for the backlight to emit light that is perceived to be colored, e.g., green or red, rather than white.

Solid state light sources are particularly advantageous in many applications. A particularly convenient solid state light source or lamp, due to its small size, high luminance, robustness, and ease of operation, is the light emitting diode or "LED". In this regard, a "light emitting diode" or "LED" refers to a diode that emits light, whether visible, ultraviolet, or infrared. It includes incoherent encased or encapsulated semiconductor devices marketed as "LEDs", whether of the conventional or super radiant variety, and whether of the forward-emitting or side-emitting variety, the latter of which is sometimes advantageous in display applications. If the LED emits non-visible light such as ultraviolet light, and in some cases where it emits visible light, it can be packaged to include an organic or inorganic phosphor to convert short wavelength light to longer wavelength visible light, in some cases yielding a device that emits white light. An "LED die" is an LED in its most basic form, i.e., in the form of an individual component or chip made by semiconductor processing procedures. For example, the LED die is ordinarily formed from a combination of one or more Group III elements and of one or more Group V elements (III-V semiconductor). Examples of suitable III-V semiconductor materials include nitrides, such as gallium nitride, and phosphides, such as indium gallium phosphide. Other types of III-V materials can be used also, as might inorganic materials from other groups of the periodic table. The component or chip can include electrical contacts suitable for application of power to energize the device. Examples include solder reflow, wire bonding, tape automated bonding (TAB), or flip-chip bonding. The individual layers and other functional elements of the component or chip are typically formed on the wafer scale, and the finished wafer can then be diced into individual piece parts to yield a multiplicity of LED dies. The LED die may be configured for surface mount, chip-on-board, or other known mounting configurations. The LED die may also be mounted on a ceramic header or substrate.

A plurality of LEDs such as Nichia NSSW020B (Nichia Chemical Industries, Ltd., Japan) may be used in some embodiments. Furthermore, one or more organic light emitting diodes (OLEDs), and/or one or more laser diodes, may be used in the disclosed light sources or groups of light sources, for example.

Figure 5:
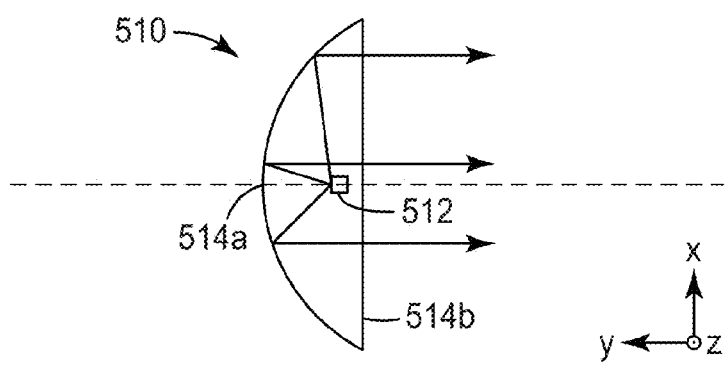
FIG. 5 is a top schematic view of another exemplary partially collimated light source.
Figure 6:
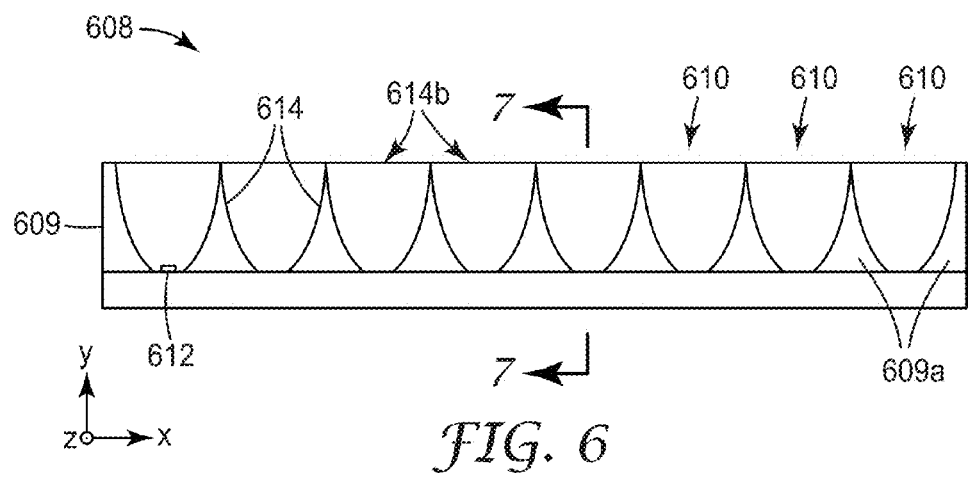
FIG. 6 is a top schematic view of an exemplary light source assembly that includes a group of partially collimated light sources.

Light sources such as those shown in FIGS. 4a, 4b, and 5 may be grouped together into an assembly such as a linear array, and the assembly may then be conveniently mounted proximate a light injection surface of a light guide. FIG. 6 is a top schematic view of an exemplary light source assembly 608 that includes a group of substantially identical partially collimated light sources 610 that are adapted for independent operation. In alternative embodiments, the light sources in a given assembly may include two or more different light source designs in an alternating arrangement or in some other desired arrangement. The assembly of FIG. 6 includes a unitary substrate 609 that is shaped to form concave surfaces 614 and output apertures 614b. The substrate 609 may be composed of a reflective metal such as aluminum, in which case the concave surfaces 614 may be reflective surfaces. Alternatively, compression-molded reflective features such as multilayer optical film may form the collimating reflective surfaces. For example, the substrate may be composed of a non-reflective material, and the concave surfaces may then be coated with a reflective material such as a conformable reflective film, in which case the concave surfaces may again be considered to be reflective surfaces. The substrate 609 need not be unitary in construction, and may be composed of multiple components of the same or different materials that are suitably attached or otherwise joined to each other. One or more lamps 612 may be mounted proximate a focus of each of the concave reflectors to provide a linear array of individually addressable partially collimated light sources 610. In the embodiment of FIG. 6, the lamps 612 are assumed to be forward-emitting similar to that of FIGS. 4a-4b, but in alternative embodiments the lamps 612 may be backward-emitting as shown in FIG. 5, whereupon the concave reflectors may be modified accordingly. The substrate may be composed of one or more metals, e.g. aluminum, or other materials having a high thermal conductivity so that it can act as a heat sink for the lamps 612.

Figure 7A:
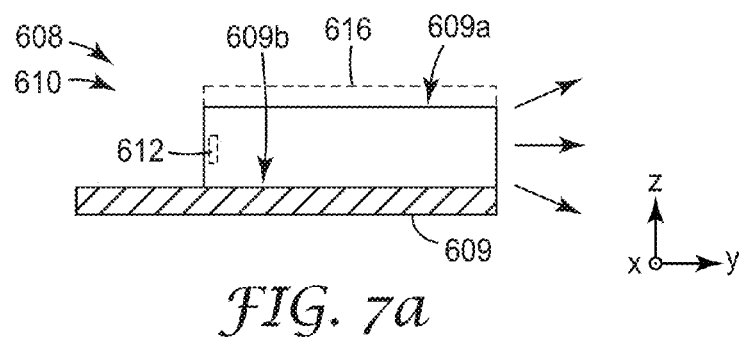
FIG. 7*a* is a schematic cross-sectional view along line 7-7 in FIG. 6 for one embodiment of the light source assembly.
Figure 7B:
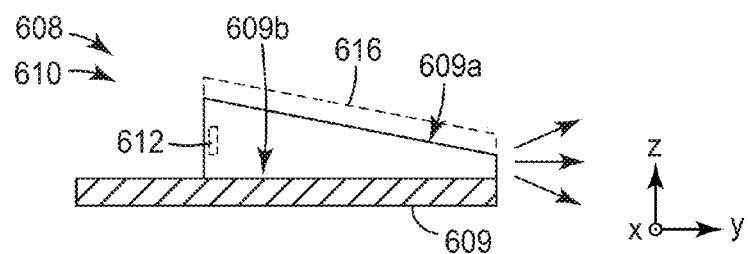
FIG. 7*b* is a schematic cross-sectional view along line 7-7 in FIG. 6 for another embodiment of the light source assembly.

Depending on the shape of the upper surface of protrusion portions 609a of the substrate 609, top and bottom reflectors can be provided for each light source 610 that are parallel or inclined relative to each other. One possible embodiment is shown in FIG. 7a, and another is shown in FIG. 7b. Both embodiments are examples of forward-emitting lamps. Each of these figures represents a schematic cross-sectional view along line 7-7 in FIG. 6 for a particular embodiment of the assembly 608. In FIG. 7a, the bottom reflector may be provided by a polished or otherwise reflective surface 609b of the substrate 609, and an upper surface of the protrusion 609a is shaped to be flat and substantially parallel to the surface 609b. With this design, a separate flat reflector 616 can be laid atop the substrate 609 over the protrusions 609a to provide a top reflector for the source 610. Note that a single elongated reflector may be placed over the entire length of the assembly 608 so as to provide top reflectors for all eight of the depicted light sources 610. In the resulting embodiment, the light sources 610 may provide substantially no collimation in the y-z plane, but partial collimation in the x-z plane.

FIG. 7b is a view similar to FIG. 7a which represents an embodiment of FIG. 6 in which top and bottom reflectors are provided that are inclined relative to each other. In FIG. 7b, the bottom reflector may again be provided by the polished or otherwise reflective surface 609b of the substrate 609, and the upper surface of the protrusion 609a is shaped to be flat and—in this case—inclined relative to the surface 609b. With this design, the separate flat reflector 616 can again be laid atop the substrate 609 over the protrusions 609a to provide a top reflector for the source 610, and again, a single elongated reflector may be placed over the entire length of the assembly 608 so as to provide top reflectors for all eight of the depicted light sources 610. In the embodiment of FIG. 7b, however, the top reflector is significantly inclined relative to the bottom reflector. The depicted inclination reduces the area of the output aperture 614b relative to the embodiment of FIG. 7a, and de-collimates light from the lamp 612 in the y-z plane to some extent. In yet another embodiment different from FIGS. 7a and 7b, the upper surfaces of the protrusions 609a can be inclined in a sense opposite that of FIG. 7b such that the top reflector is inclined in an opposite sense to the bottom reflector so as to increase the area of the output apertures 614b and partially collimate light from the lamp 612.

Figure 8:
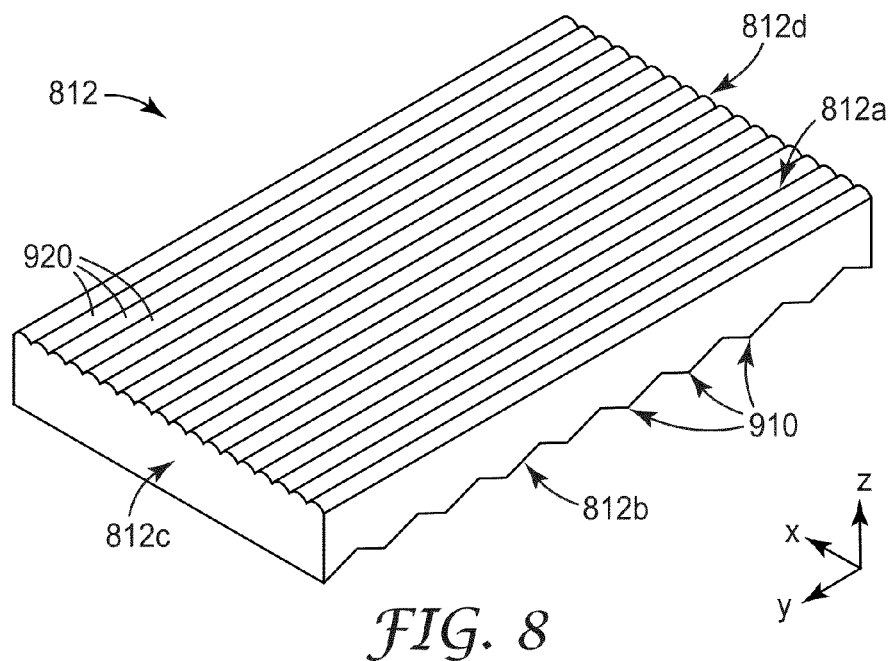
FIG. 8 is a schematic perspective view of an exemplary slatless light guide, which view shows in exaggerated fashion exemplary surface structure on the two major surfaces of the light guide.
Figure 9A:
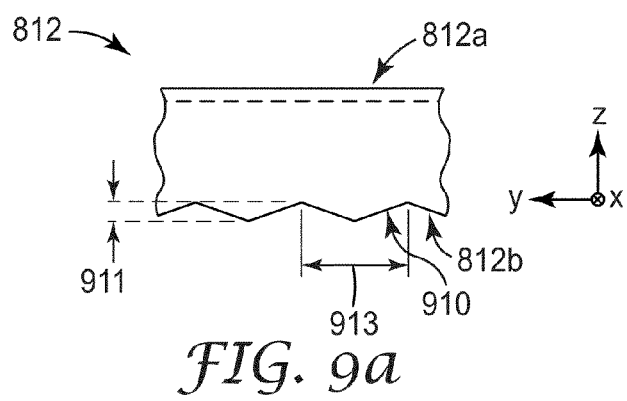
FIGS. 9*a*, 9*b*, and 9*c* show various schematic side views of various embodiments of the light guide of FIG. 8.
Figure 9B:
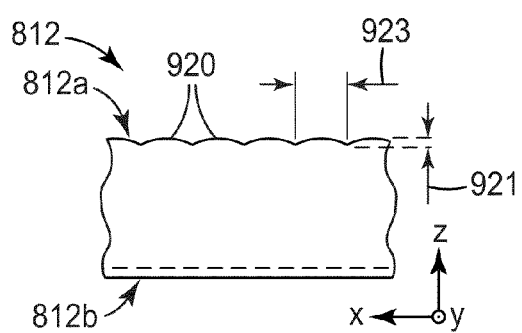
Figure 9C:
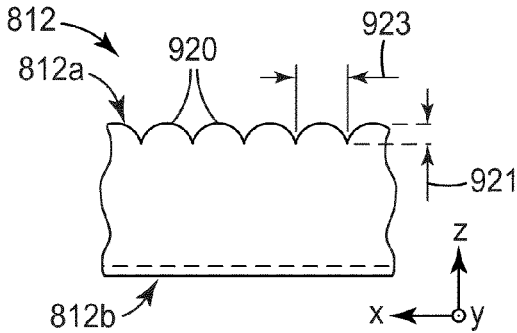

Turning now to FIG. 8, we see there a schematic perspective view of an exemplary slatless light guide 812 suitable for use in the disclosed backlights, which view shows in exaggerated fashion exemplary surface structure on the two major surfaces of the light guide. Schematic side views of various embodiments of the light guide are shown in FIGS. 9a, 9b, and 9c. The light guide 812 includes a first major surface 812a from which light is extracted towards a display panel and/or observer, a second major surface 812b opposite the first major surface, and side surfaces 812c, 812d which may serve as light injection surfaces for left-beam-emitting and right-beam-emitting partially collimated light sources as discussed elsewhere herein. For example, the light source assembly 608 of FIG. 6 may be positioned along the side surface 812c to provide a left eye beam emitted from the light guide 812, and a similar assembly can be positioned along the side surface 812d to provide a right eye beam emitted from the light guide 812.

The rear major surface 812b of the light guide is preferably machined, molded, or otherwise formed to provide a linear array of prism structures 910 shown best in FIG. 9a. These prism structures are designed to reflect an appropriate portion of the light propagating along the length of the light guide so that the reflected light can refract out of the front major surface 812a into air and onward to the display panel and/or observer (optionally with one or more intervening light management films such as prismatic light redirecting film), and so that such reflected light is extracted from the front major surface relatively uniformly along the length of the light guide. The surface 812b may be coated with a reflective film such as aluminum, or it may have no such reflective coating. In the absence of any such reflective coating, a separate back reflector may be provided proximate the surface 812b to reflect any downward-propagating light that passes through the light guide so that such light is reflected back into and through the light guide. Preferably, the prism structures have a depth 911 that is shallow relative to the overall thickness of the light guide, and a width 913 that is small relative to the length of the light guide. The light guide may be made of any transparent optical material, preferably with low scattering such as an acrylic polymer, e.g., Spartech Polycast material. In one exemplary embodiment, the light guide may be made of acrylic material, such as cell-cast acrylic, and may have an overall thickness of 1.4 mm and a length of 140 mm along the y-axis, and the prisms may have a depth 911 of 2.9 micrometers and a width 913 of 81.6 micrometers, corresponding to a prism apex angle of about 172 degrees.

The front major surface 812a of the light guide is preferably machined, molded, or otherwise formed to provide a linear array of lenticular structures 920 that are parallel to each other and to a second axis (e.g. the y-axis) different from a first axis (e.g. the x-axis) along which the prism structures 910 extend. The lenticular structures are preferably shaped and oriented to (1) enhance angular spreading along the x-axis for light that passes out of the light guide through the front major surface, and (2) to limit spatial spreading along the x-axis for light that remains in the light guide by reflection from the front major surface. For example, the structures 920 (best seen in FIGS. 9b and 9c, which depict somewhat differently shaped lenticular structures for the embodiment of FIG. 8) have curvature in the x-z plane, so that light that refracts out of the light guide through surface 812a is spread over a controlled range of angles in the x-z plane for optimum viewing. We have found that the amount of curvature of structures 920 in the x-z plane can also play a significant role in the amount of spreading (along the x-axis) experienced by a beam of light propagating laterally within the light guide along the y-axis. Preferably, the lenticular structures 920 have a depth 921 that is shallow relative to the overall thickness of the light guide, and a width 923 that is small relative to the width of the light guide, and/or small relative to a width of a transverse band of light produced by one of the partially collimated light sources, and/or small relative to a width of the exit aperture of a concave reflector of such light source. For reduced lateral spreading and improved lateral confinement of a transverse band of light produced by a partially collimated light source, the lenticular structures are preferably relatively strongly curved, as shown in FIG. 9c, rather then more weakly curved, as shown in FIG. 9b. For example, the lenticular structures may have a curved shape that is or approximates a half-circle. Alternatively, the lenticular structures may have a curved shape comprising a circular arc characterized by an angle in a range from 45 to 180 degrees, or from 90 to 180 degrees, for example. In an exemplary embodiment, the light guide may be made of cell-cast acrylic and may have an overall thickness of 0.76 mm, a length of 141 mm along the y-axis, and a width of 66 mm along the x-axis, and the lenticular structures 920 may have a radius of 35.6 micrometers, a depth 921 of 32.8 micrometers, and a width 923 of 72.6 mm, for example. In this embodiment, the prism structures 910 may have a depth 911 of 2.9 micrometers, a width 913 of 81.6 micrometers, and a prism apex angle of about 172 degrees.

EXAMPLE

A scanning backlight similar to that of FIG. 3b was constructed. The light guide was slatless, composed of cell-cast acrylic, and was about 260 mm long, 123 mm wide, and 3.2 mm thick. On the two opposed short sides (the sides of dimension 123 mm) of the light guide, a light source assembly having eight partially collimated light sources, similar to the embodiment depicted and described in connection with FIGS. 6 and 7a, was placed. One light source assembly generated a right eye beam and the other light source assembly generated a left eye beam. All sixteen light sources were individually addressable, such that any one light source or any combination of light sources could be energized as desired. The substrate of the light source assembly (see item 609 in FIG. 6) was a single piece of machined aluminum stock with nominally parabolic surfaces (see item 614 in FIG. 6) for each light source. The parabolic surfaces generally conformed to the equation $y=(0.25)*x^2$, where x and y are expressed in millimeters. A flat piece of sheet aluminum covered the top of the light source assembly. The parabolic side surfaces, the bottom surface, and the top surface (which was parallel to the bottom surface) of each light source cavity—i.e., all interior surfaces that bounded each light source cavity—were covered with Vikuiti™ Enhanced Specular Reflector (ESR) film. (In other embodiments, other reflective films, such as aluminum-coated PET film, may be acceptable in a given application.) The width of the output aperture for each light source (see e.g. the width of apertures 614b in FIG. 6 along the x-axis) was about 15.0 mm, and the height of the apertures was about 3 mm. For each light source, a Nichia type 119 LED was used for the lamp (see item 612 in FIG. 6), and the LED was mounted such that the center of the LED was at the focus of the parabolic reflector. The light sources were all of the forward-emitting design.

With regard to the structured surface designs used for the slatless light guide, the prisms of the rear major surface had a depth of 2.9 micrometers, and a width of 81.6 micrometers, and a prism apex angle of about 172 degrees, and were oriented as shown in FIG. 8 along an x-axis. The lenticular structures of the front major surface had a radius of 35.6 micrometers, a depth of 32.8 micrometers, and a width of 72.6 mm, and were oriented as shown in FIG. 8 along a y-axis.

Atop the front major surface of the light guide was placed a redirecting film that had structured or faceted features on both major surfaces of the film. The front major surface, which faced the observer, included linear lenticular features. Each lenticular feature had, in cross-section, a radius of curvature (characteristic of a circular arc) of about 22.6 micrometers, and a height of about 5.27 micrometers. (Note, in some cases non-circular shapes, e.g. aspheric shapes, may also be used.) The back major surface, which faced the light guide, included linear prismatic features that were parallel to each other and parallel to the linear lenticular features on the front surface of the redirecting film. Each linear prismatic feature had an included prism angle (full dihedral angle between facets of a given prism) of 60 degrees, and a height of 20.55 micrometers. Moreover, the redirecting film was oriented such that the linear lenticular and prismatic features of the redirecting film were parallel to the prisms on the rear major surface of the light guide. The lenticular and prismatic features of the redirecting film were substantially paired across the width of the display such that every lenticular feature was nominally matched to a prismatic feature, although an offset between pairs of lenticular and prismatic features was provided which changed across the width of the display by up to ½ of the feature width for ½ of the display width.

Figure 10:
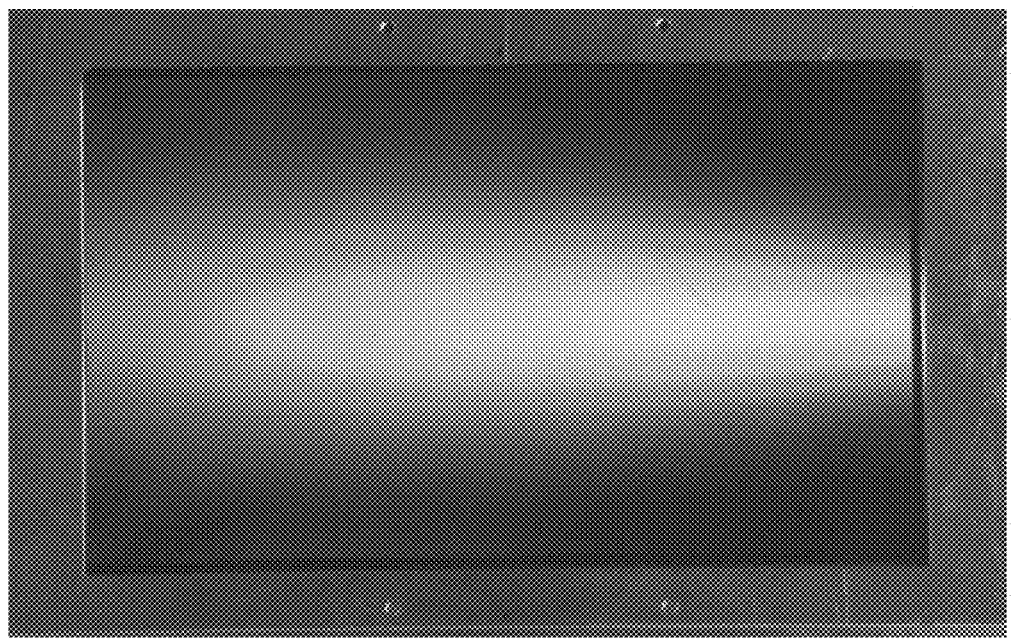
FIG. 10 is a grayscale image of a front or top view of a scanning backlight that was constructed and tested, the image demonstrating that a limited zone or band of the backlight can be illuminated using a slatless lightguide.

One of the light sources was energized, and a picture of the backlight was taken at normal incidence, i.e., viewing the backlight from a vantage point along the optical axis or z-axis of the system, with a Fuji FinePix REAL 3D W1 camera system in 2D mode. The results are shown in FIG. 10. Keeping in mind that eight light sources were arranged along each of the side surfaces of the backlight (edge-lit backlight configuration), the light source that was energized for purposes of FIG. 10 was the fourth light source from the top on the right-hand side of the backlight. The figure confirms that light from the light source is substantially laterally confined to a first transverse band of the light guide. Similar results were obtained when other ones of the light sources were energized, with the transverse band observed to shift vertically (from the viewpoint of FIG. 10) in accordance with the position of the energized light source along the edge of the light guide.

Figure 11:
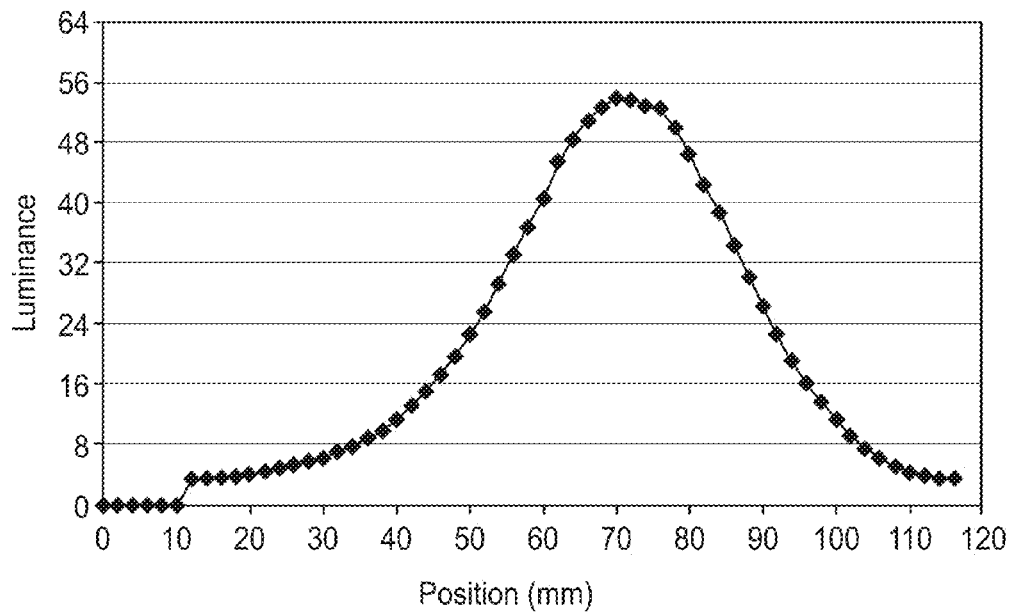
FIGS. 11 and 12 are graphs of luminance versus position for scanning backlights similar to that of FIG. 10 that were constructed and tested.
Figure 12:
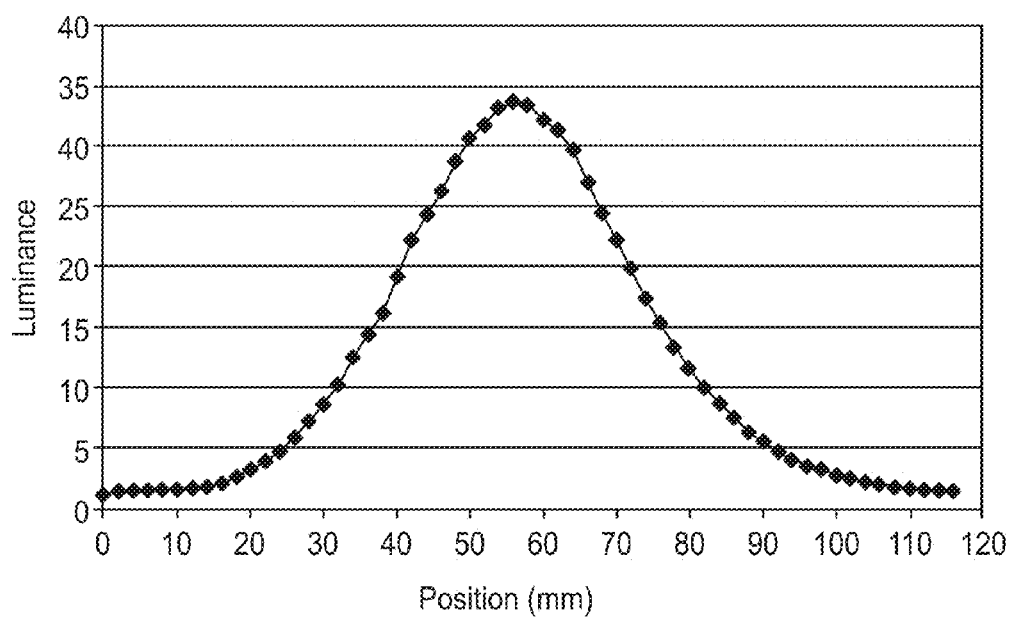

FIGS. 11 and 12 are graphs of luminance versus position for scanning backlights similar to that of FIG. 10 that were constructed and tested. For FIG. 11, substantially the same backlight as that of FIG. 10 was used, except that two light sources were energized at the same time—the fourth light source from the top on the left side of the backlight, and the fourth light source from the top on the right side of the backlight. The light source assemblies were aligned such that these two energized light sources were disposed at substantially the same vertical position. The luminance was measured in the same manner as FIG. 10, and a scan of luminance along a vertical line in the middle of the backlight (from the viewpoint of FIG. 10) was made. The results are plotted in FIG. 11, where the position coordinate is the position on the scan from the top edge of the backlight.

FIG. 12 is a graph of luminance versus position for a scanning backlight similar to that of FIG. 11, but where the light source assemblies were modified so that the top and bottom reflectors were converging (see e.g. FIG. 7b) rather than parallel. This resulted in a reduction in the height of the output aperture of each light source from 3 mm to 1 mm, while the width of the apertures remained the same at about 15.0 mm. Other relevant design characteristics of the backlight remained the same. For FIG. 12, two light sources were energized at the same time—the fifth light source from the top on the left side of the backlight, and the fifth light source from the top on the right side of the backlight. Again, these two light sources were disposed at substantially the same vertical position of the backlight. The luminance was measured in the same manner as in FIG. 11, and the results are plotted in FIG. 12.

As discussed above, the degree to which the illuminated band of light produced by a given light source diverges across the output surface of the light guide, e.g. as measured by the angle between one of the borders or edges of the illuminated band and the central axis of the band (e.g. the y-axis in FIGS. 3a and 3b), as viewed from above or from the front, is a function of how well the light source itself is collimated, and design details of the lenticular features on the front of the light guide (e.g. features 920 in FIG. 8). For light sources using the forward-facing LED design, see e.g. FIGS. 4a and 4b, source collimation can be improved by designing the concave reflector to be deeper (where depth in this regard is measured along the y-axis in FIGS. 4a, 4b) to reduce the cone of light that exits the light source without reflecting off of the reflector (see ray 415a in FIG. 4a). For the light source assemblies described in the above examples, the limit or envelope of that cone of light is characterized by an angle of 20 degrees relative to the central axis of the band, where the 20 degree value takes into account refraction of the light into the polymeric light guide. However, even with a light source that is substantially completely collimated in the plane of the light guide, the lenticular features at the front of the light guide may cause the illuminated band of light to diverge by some amount. For example, for the case of the hemispherical lenticular features shown in FIG. 9c, a laser beam that was collimated in the plane of the light guide was injected into the light guide through the light injection surface such that the laser light bounced back and forth between the front and rear major surface of the light guide, and an 11 degree angle of divergence (measured between one border or edge of the resulting illuminated band and the central axis of the band) was observed. Lenticular elements having substantially shorter circular arcs (see e.g. FIG. 9b) produced greater amounts of divergence.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. For example, the reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

The invention claimed is:

1. A backlight, comprising:
a slatless light guide having opposed first and second major surfaces and at least a substantially planar first light injection surface; and
at least a first light source assembly separated from the first light injection surface by an air gap, the first light source assembly comprising a first and second light source arranged along the first light injection surface to inject a first and second light beam, respectively, into the light guide through different portions of the first light injection surface, the first and second light beams being partially collimated, and the first and second light sources being adapted for independent operation, the first light source assembly further comprising at least one non-light emitting surface disposed proximate and substantially parallel to the first light injection surface, the at least one non-light emitting surface being adapted to substantially absorb light;
wherein the first major surface comprises a plurality of first structures, the first structures being parallel to each other and to a first axis; and
wherein the second major surface comprises a plurality of second structures, the second structures being parallel to each other and to a second axis different from the first axis, the second structures being adapted to enhance angular spreading along the first axis for light that passes out of the light guide through the second major surface, and to limit spatial spreading along the first axis for light that remains in the light guide by reflection from the second major surface.

2. The backlight of claim 1, wherein the first and second light sources cooperate with the light guide such that light from the first light source is substantially laterally confined to a first transverse band of the light guide, and light from the second light source is substantially laterally confined to a second transverse band of the light guide different from the first transverse band.

3. The backlight of claim 2, wherein the first and second transverse bands each extend along the second axis but are shifted relative to each other along the first axis.

4. The backlight of claim 2, wherein the second structures are arranged in a regular array with a structure-to-structure spacing less than a width of the first transverse band.

5. The backlight of claim 1, wherein the first light injection surface is a side surface of the light guide.

6. The backlight of claim 1, wherein the first and second light sources are members of a first plurality of light sources arranged along the first light injection surface, each such light source comprising at least one lamp and a concave reflector to partially collimate light from the lamp in a plane of the light guide.

7. The backlight of claim 6, wherein, for each light source of the first plurality of light sources, the concave reflector is substantially parabolic, and the at least one lamp is disposed proximate a focus of the parabolic reflector.

8. The backlight of claim 6, wherein, for each light source of the first plurality of light sources, the concave reflector defines a vertex and an output aperture, and the at least one lamp has an emitting surface oriented to face the output aperture.

9. The backlight of claim 6, wherein, for each light source of the first plurality of light sources, the concave reflector defines a vertex and an output aperture, and the at least one lamp has an emitting surface oriented to face the vertex.

10. The backlight of claim 6, wherein each light source further comprises a top and bottom reflector, the top and bottom reflectors being substantially parallel to each other.

11. The backlight of claim 6, wherein each light source further comprises a top and bottom reflector, the top and bottom reflectors being inclined relative to each other.

12. The backlight of claim 6, the light guide further comprising a second light injection surface opposite the first light injection surface, the backlight further comprising:
a second plurality of light sources arranged along the second light injection surface, each such light source comprising at least one lamp and a concave reflector to partially collimate light from the lamp in a plane of the light guide.

13. The backlight of claim 1, wherein the plurality of first structures comprises an array of prisms, each prism having an included prism angle of at least 160 degrees.

14. The backlight of claim 1, wherein the second axis is substantially perpendicular to the first axis.

15. The backlight of claim 1, wherein the second structures have a curved shape in cross-section.

16. The backlight of claim 15, wherein the curved shape comprises a half-circle.

17. The backlight of claim 15, wherein the curved shape comprises a circular arc characterized by an angle in a range from 90 to 180 degrees.

18. The backlight of claim 1, further comprising a controller coupled to the light sources, the controller adapted to independently activate the first and second light sources.

19. A backlight, comprising:
a slatless light guide having opposed first and second major surfaces and at least a first light injection surface; and
a first light source assembly separated from the first light injection surface by an air gap, the first light source assembly including a first and second light source arranged along the first light injection surface to inject a first and second light beam, respectively, into the light guide through different portions of the first light injection surface, the first and second light beams being partially collimated, and the first and second light sources being adapted for independent operation, the first light source assembly further comprising at least one non-light emitting surface disposed proximate and substantially parallel to the first light injection surface, the at least one non-light emitting surface being adapted to substantially absorb light;

wherein the first major surface comprises a plurality of first structures, the first structures being parallel to each other and to a first axis; and wherein the second major surface comprises a plurality of second structures, the second structures being parallel to each other and to a second axis different from the first axis;

wherein the first and second light sources, and the first and second structures, are adapted so that light from the first light source is substantially laterally confined to a first transverse band of the light guide, and light from the second light source is substantially laterally confined to a second transverse band of the light guide different from the first transverse band.

20. The backlight of claim 19, wherein the first and second light sources are members of a plurality of light sources arranged along the first light injection surface, each such light source comprising at least one lamp and a concave reflector to partially collimate light from the lamp in a plane of the light guide.

21. The backlight of claim 20, wherein each light source further comprises a top and bottom reflector, the top and bottom reflectors being substantially parallel to each other.

22. The backlight of claim 20, wherein each light source further comprises a top and bottom reflector, the top and bottom reflectors being inclined relative to each other.

\* \* \* \* \*